INVENTOR
JOHN MATTHEWS
BY
Cushman, Darby & Cushman
ATTORNEYS

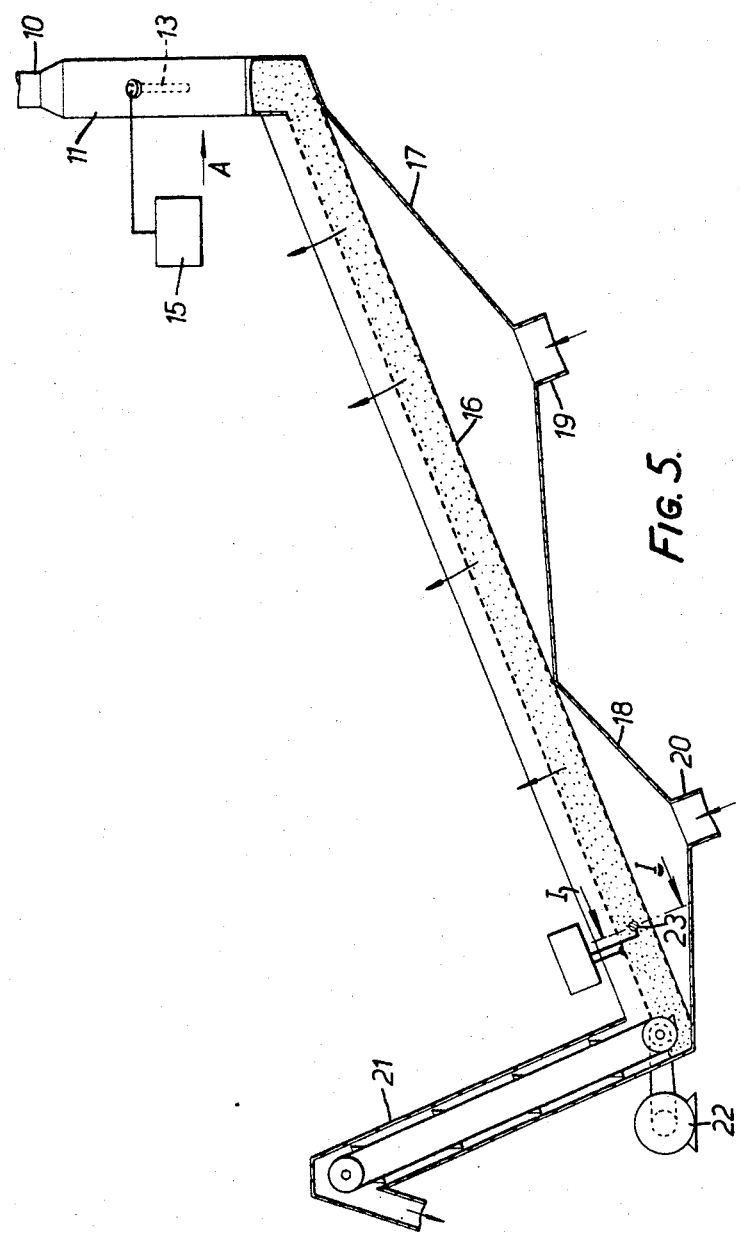

United States Patent Office 3,400,468
Patented Sept. 10, 1968

3,400,468
APPARATUS FOR CONTROLLING THE DRYING OF PARTICULATE MATERIALS
John Matthews, Stopsley, Luton, England, assignor to National Research Development Corporation, London, England
Filed Mar. 9, 1967, Ser. No. 621,838
Claims priority, application Great Britain, Mar. 11, 1966, 10,942/66
12 Claims. (Cl. 34—52)

ABSTRACT OF THE DISCLOSURE

A continuous flow grain drier having electrical moisture sensors at the input and output ends and control apparatus for controlling the extent of drying in response to signals from the input and output sensors. The control apparatus includes a reset potentiometer arranged to apply a control signal, the base voltage across the potentiometer being determined by the input sensor while the wiper of the potentiometer is driven in opposite directions when the signal from the output sensor exceeds a specified range.

Background of the invention

This invention relates to apparatus for controlling the drying of particulate material, such as grain, peas, beans, or similar agricultural produce.

It is known in continuous drying plant to provide a moisture sensor for controlling automatically the extent of drying. However a problem arises in that changes in the moisture content of the material entering the plant produce a delayed reaction from any moisture sensor positioned adjacent the point of delivery from the plant. When there is an increase in the moisture content of the incoming material the signal from an output moisture sensor will act in due course on the control system to increase the drying effect, but there will be a delay between the initiation of this control change and a corresponding variation in the moisture of the material being discharged. This tends to produce huntng or unnecessary fluctuations in the controlled degree of drying. It is, of course, possible to reduce hunting by ensuring that the control signals are applied slowly or only in limited steps but this reduces the efficiency of the control system and cannot accommodate sudden large changes in the moisture content of the material entering the plant. Accordingly it is an object of the present invention to provide an improved control system which will obviate or reduce the above disadvantages.

Summary of the invention

According to the invention apparatus for controlling the drying of particulate material includes input and output moisture sensors positioned respectively adjacent the input and output points of a drying plant through which the material is passed, and control means for controlling the degree of drying effected, the control means including means for providing a control signal which varies with changes in the moisture content sensed at the output sensor, a reset device for imposing an additional control factor on the control signal when the sensed output moisture content passes out of a selected range, and means for imposing a further control factor which varies in accordance with variations in the moisture content sensed at the input sensor.

According to a preferred feature of the invention the means for imposing the further control factor is arranged to vary the additional control factor imposed by the reset device.

Conveniently the reset device includes a reversible electric motor driving a potentiometer from which the reset signal is obtained. For example in one preferred construction the electric motor is controlled in response to changes in the moisture content sensed at the output sensor, and the base voltage applied to the potentiometer is controlled in response to changes in the moisture content sensed at the input sensor, or vice versa. A reset device of this nature is particularly simple in construction and may be arranged to eliminate or reduce persistent errors in the controlled moisture content level, which might otherwise exist with a strictly proportional control system, particularly where the drying process is of long duration.

Preferably the output moisture sensor is of the capacitance type and is included in an A.C. bridge circuit, providing an A.C. output whose amplitude and phase are related respectively to the magnitude and sense of the difference between the sensed output moisture content and a selected moisture content.

The electric motor is conveniently actuated in one direction or the other in accordance with operation of a primary switching device, connected to the output of the moisture sensor through a phase-sensitive detector, which provides a D.C. signal whole polarity varies in accordance with changes in the sense of the sensed moisture content in relation to the selected moisture content.

According to a preferred feature of the invention the apparatus includes temperature compensating means, arranged to compensate for errors in the signal obtained from a moisture sensor caused by variations in the temperature of the material.

The control means may include a proportioning device arranged to produce a larger proportional change in the output control signal when the sensed moisture content is below a selected datum value, and a smaller proportional change when the sensed moisture content is above this value. Such a proportioning device is of value in compensating for the usually non-linear relationship between the throughput rate of the material being dried, and the extent to which the moisture level is reduced.

The control means may be arranged to control the rate of flow of material through a drying section of the apparatus. Alternatively the control means may be arranged to control the degree of drying, such as the temperature of the drying air, exerted by a drying section of the apparatus.

In particular the control apparatus may be arranged to control the degree of drying of grain by the grain drier by controlling the temperature to which the grain is raised during drying and/or the length of time of the drying period, or if, for example, the grain is dried by forcing gas such as air through it, by controlling the duration and/or rate of flow of gas through the grain to dry it and/or the temperature of that gas.

Alternative forms of control mechanism suitable for adjustment by the control means may consist of variable speed paddle systems or scoops carried on endless chains or belts.

A capacitance type moisture sensor can be extremely sensitive, but special precautions should be taken. Since the dielectric constant of the grain will be dependent in part upon the temperature of the grain (it is found that an increase of 1° F. affects the dielectric constant to the same extent as a moisture content increase of approximately .05%) the device providing a measure of the capacitance of the sensing capacitor, is preferably arranged, as for example by including a temperature-responsive component, so that compensation is automatically provided for changes in the output signal which are due to changes in the temperature of the grain. Where the device comprises an A.C. bridge circuit, one such temperture-responsive component may comprise a compensating capacitor connected in one arm of the bridge in series with the sensing capacitor, the compensating capacitor having negative temperature coefficient.

In some embodiments of the invention it is found that the frequency of the A.C. supply to the bridge circuit affects the efficient operation of the apparatus. At a frequency of approximately 800 kilocycles per second, for example, the resistance component of the grain impedance has a detrimental effect on the balancing of the bridge and the bridge is unduly sensitive to grain surface effects. A frequency of 2 megacycles per second is found to diminish such grain surface effects and increase the linearity of the bridge circuit output signal with changes in the moisture content of the grain.

The invention may be put into practice in various ways and one preferred form of apparatus embodying the invention will now be described by way of example only with reference to the accompanying drawings in which

*Brief description of the drawings*

FIGURE 5 is a diagrammatic side elevation, of the complete continuous flow grain drier.

*Detailed description*

Figure 6:
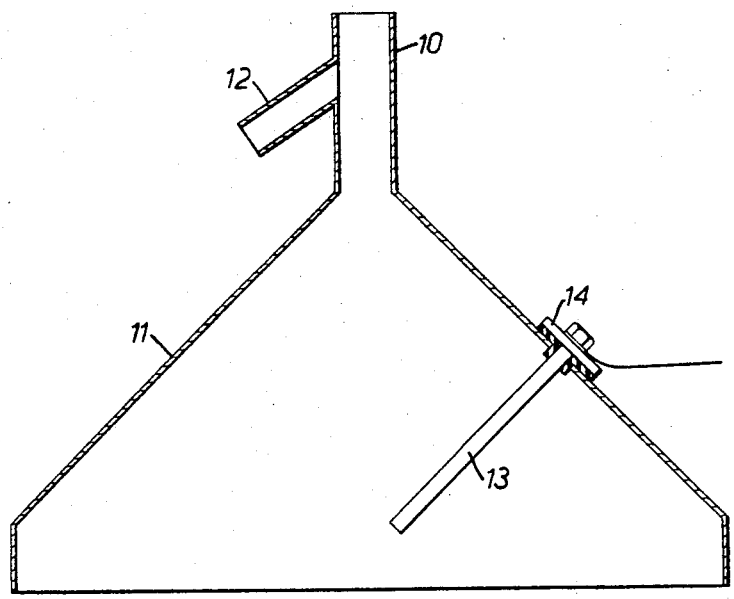
FIGURE 6 is a view in the direction of arrow A in FIGURE 5, on an enlarged scale, showing the location of the electrode of the input moisture sensing means.

The grain drier illustrated generally in FIGURE 5, comprises a grain inlet duct 10, leading to a fish-tail distributor chute 11, at the upper end of which is provided a grain overflow discharge duct 12 (see FIGURE 6). Within the chute 11 is positioned a sword-shaped electrode 13 constituting part of a resistance-type moisture sensor for sensing the moisture level of the incoming grain. The electrode 13 is insulated from the wall of the chute by an insulating sleeve 14, the wall itself constituting the other electrode. Electrical connections from the electrode 13 and the wall of the chute lead to an input monitor unit 15, to be described in detail with reference to FIGURE 7.

From the chute 11 the moist grain passes onto an inclined perforated bed 16, beneath which are arranged two air manifolds 17 and 18. Heated drying air is supplied to the first manifold 17 through a duct 19, and passes through the bed 16 and upwards through the grain. As the grain moves downwards along the bed it next passes over the second manifold 18 to which cooling air is supplied by a duct 20, this air also passing upwards through the bed 16 and the grain. Finally at the bottom of the bed the grain is removed by a bucket-type elevator 21 driven by a variable speed motor 22. The rate at which grain moves down the bed 16 is determined by the rate of oscillation of an oscillating grid (not shown) above the bed.

Adjacent the lower end of the drying bed there is provided an output moisture sensing unit of the capacitance type, including an electrode unit indicated generally at 23 in FIGURE 5 and shown in detail in FIGURE 1, and an output monitor unit to be described in more detail with reference to FIGURES 2, 3 and 4.

Figure 1:
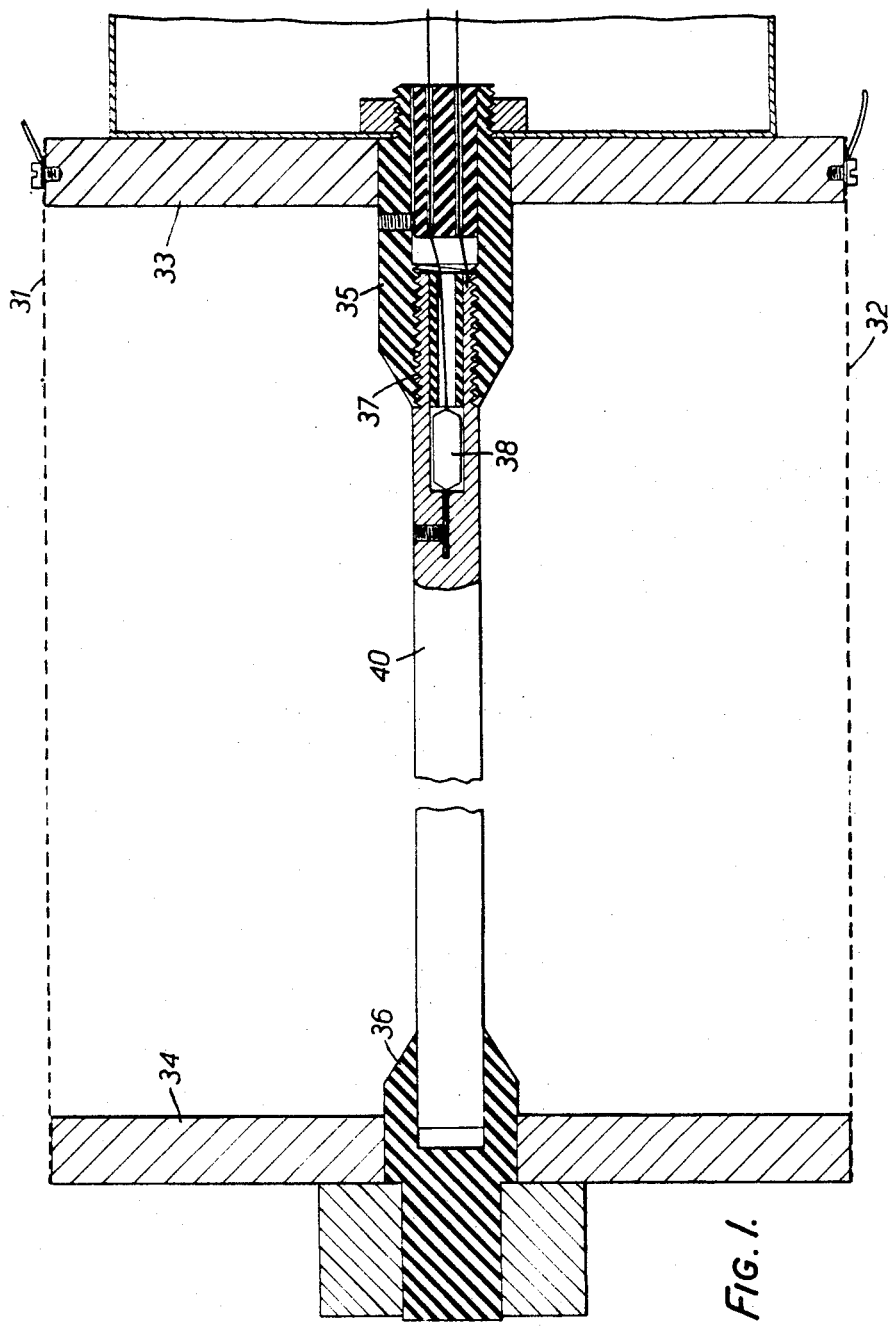
FIGURE 1 is a somewhat diagrammatic vertical section through the drying zone of a continuous flow grain drier of the cross flow type, on the line I—I of FIGURE 5, and indicates the form and arrangement of a cylindrical rod located adjacent the output end of the drying zone and comprising one electrode of a sensing capacitor.

The electrode unit 23 of the output moisture sensor is illustrated in FIGURE 1. In this section of the grain drier the grain is confined between perforated top and bottom walls 31, 32, (the bottom wall 32 constituting part of the bed 16).

The perforated walls 31, 32 are of metallic material and together form one electrode of the sensing capacitor, the other electrode thereof being provided by an aluminium rod 40 having a diameter of about ½ inch extending between the two sides 33, 34 of the bed and having its opposite ends housed in the bores of two bushings 35, 36 of electrically insulating material respectively secured upon the two sides 33, 34. One end 37 of the rod is screwed into the internally threaded bushing 35 while the other end is a sliding fit in the bushing 36 to allow for changes in the length of the rod with changes in temperature.

Figure 2:
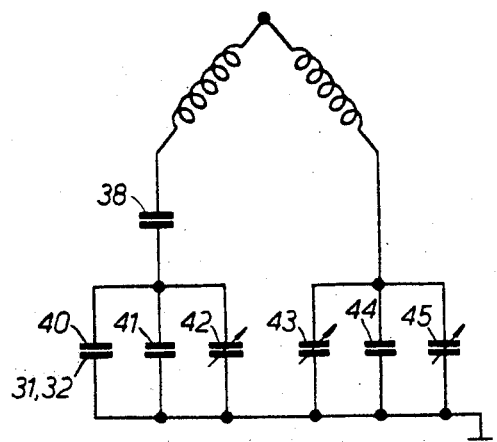
FIGURE 2 is a circuit diagram of an A.C. bridge circuit comprising part of control apparatus incorporated in the grain drier whereof the drying zone is shown in FIGURE 1.

As will be understood the stream of grain passing through the drying zone thus forms part of the dielectric medium of the capacitor and thus as the moisture content of the grain changes so also will change the value of the capacitor and hence the output signal from the bridge circuit in which the capacitor is connected (FIGURE 2).

Housed within a hollow bore formed in the end of the rod is a small temperature-responsive component in the form of a compensating capacitor 38 having a negative temperature coefficient. The compensating capacitor 38 is connected in series with the sensing capacitor 31, 32, 40, to form, together with two capacitors 41, 42 connected in parallel with the sensing capacitor, one arm of the A.C. bridge circuit (FIGURE 2). The capacitor 41 has a fixed value but the capacitor 42 is of variable type and is preset to the value for which a condition of optimum temperature compensation is obtained.

The corresponding balance arm of the bridge comprises three capacitors 43, 44, 45 arranged in parallel, two of these 43, 45 being of the variable preset type and the third 44 being of fixed value. One of the capacitors 43, 45 is preset when balancing the bridge with no grain in the drying zone of the drier while the other 45, which may be provided with a calibrated scale, is set at a datum value at which zero output is obtained from the bridge circuit with the drying zone full and the dielectric constant of the grain forming the dielectric medium between the electrodes of the sensing capacitor at a value corresponding with the delivery of the grain from the drier at a predetermined rate and of a moisture content of predetermined value.

Figure 3:
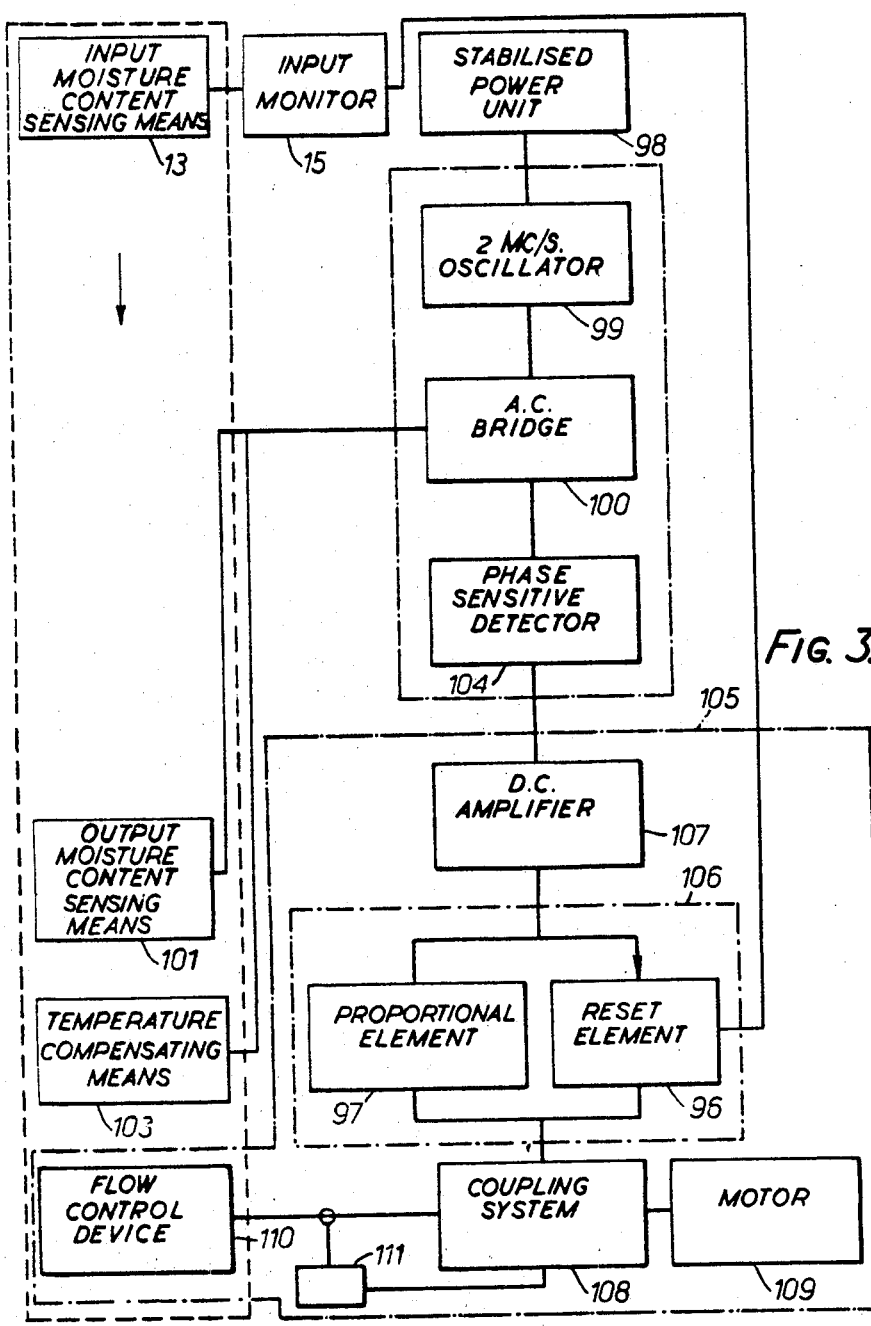
FIGURE 3 is a block diagram of the combined drier and part of the control apparatus.
Figure 4:
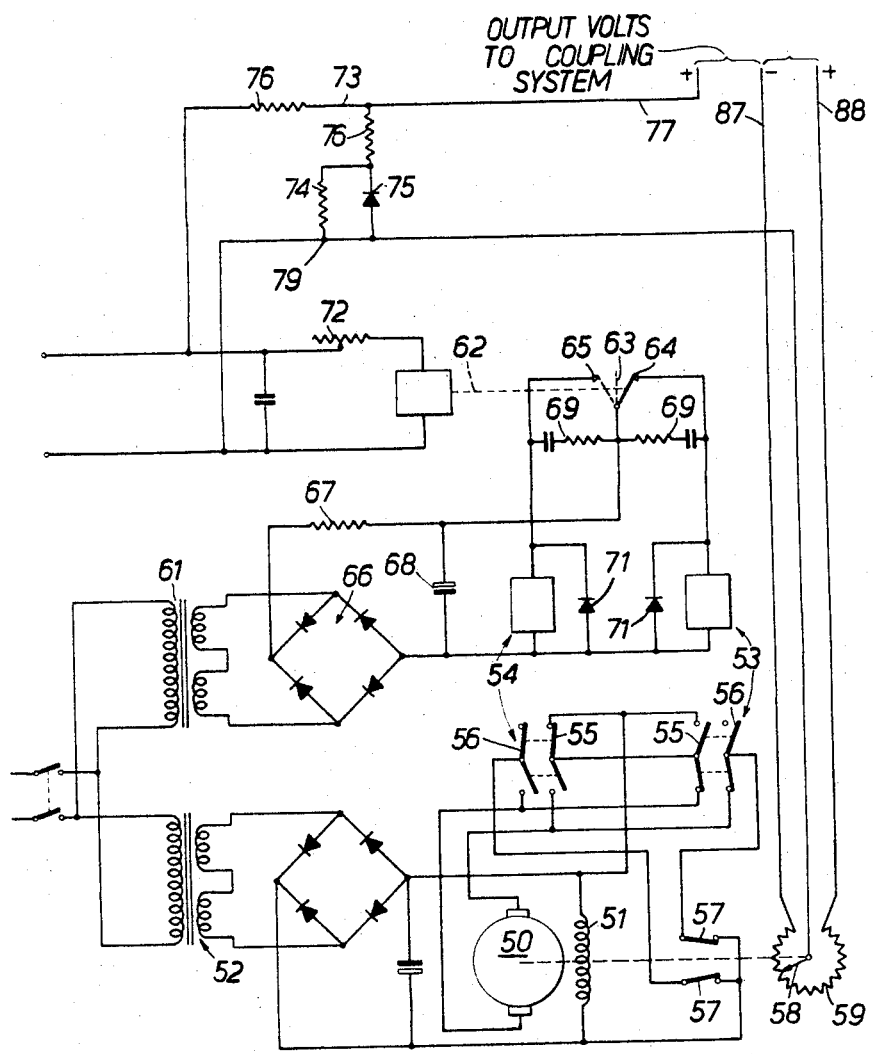
FIGURE 4 is a wiring diagram of part of the control means associated with the drier.

Referring now to the block diagram of FIGURE 3, the A.C. bridge circuit 100 produces an output signal which changes in response to changes in the dielectric constant of grain passing in a stream through the electric field set up between the two electrodes of the output sensing capacitor 101 to give a measure of the moisture content of the grain. Changes in the dielectric constant due not to changes in the moisture content of the grain but to changes in the temperature of the grain are compensated for by the temperature compensating means 103. The bridge circuit 100 is supplied by a 2 mc./s. oscillator 99, operating from a stabilised power unit 98.

The output signal from the bridge circuit is fed to a phase sensitive detector 104 which derives from the alternating output signal a volatge output signal which corresponds in magnitude to the difference between the sensed moisture content and the "datum" moisture content corresponding with the datum value, the polarity of the signal indicating the sense of the said difference. The signal is then fed to control means 105 arranged to control the rate of flow of grain through the drier and thus control the degree of drying exerted by the drier on the grain.

In the control means a control circuit 106 connected to receive the voltage output signal after amplification in an amplifier 107 is arranged to act in response to the combined signals from the output sensor 101 and the input sensor 13, and to develop a control signal which is applied to a coupling system 108 including a variable speed magnetic clutch between the output shaft of a driving motor 109 and a rotating shaft which actuates the flow control device 110 of the grain drier, which device comprises an oscillating grid. The coupling system is arranged so that the transmission through the clutch, and therefore the speed of rotation of the shaft and the rate of flow of grain through the drier under the control of the oscillating grid, is in correspondence with the control signal applied to it, a tacho-generator 111 coupled to the shaft providing a feed-back signal which is balanced against the applied control signal.

In the control circuit 106, which comprises a proportional element 97 and a reset element 96, a proportion of the voltage output signal from the amplifier 107 is added to the voltage developed between one end of a potentiometer (59 in FIGURE 4) and the potentiometer wiper to form the control signal applied to the coupling system. The setting of the potentiometer is adjusted by a gear system (not shown) driven by a D.C. reversible reset-motor 50 (FIGURE 4), the motor being energised to drive the wiper in the appropriate direction on operation of one or other of two relays whenever the magnitude of the voltage output signal from 107 exceeds a fixed amount. In the embodiment now being described the fixed amount corresponds with a difference of ±.25% in the "datum" and the sensed moisture content of the grain, and the direction of the drive applied to the wiper is of course, such as to cause a change in the rate of flow of grain through the drier to diminish the difference.

As indicated in the diagram of the control circuit (FIGURE 4) the field winding 51 of the D.C. reset motor is permanently coupled to receive the output of a voltage stepdown transformer 52 while the armature of the motor is connected to receive rectified current from the same source on actuation of one or other of two relays 53, 54. The polarity of the voltage applied to the armature, and therefore the ensuing direction of rotation thereof, is determined by which of the two relays is actuated.

Each relay has two moving contact arms 55, 56 each of which, on energisation of the relay, is swung out of electrical contact with a respective "off" contact into connection with an "on" contact, the contact arms returning into connection with their "off" contacts on de-energisation of the relay. In FIGURE 4 the contact arms of the relay 53 are shown in the "on" position.

The contact arms 55 of the two relays are in permanent electrical contact while their contact arms 56 are connected through respective normally closed limit switches 57 to the positive side of the rectifier output of the transformer 52. The "off" contacts of the contact arms 55 of the two relays are permanently connected to the negative side of the rectifier output. The "on" contact of the contact arm 55 of the relay 53, and the "on" contact of the contact arm 56 of the relay 54 are both connected to the same terminal of the motor armature while the remaining two "on" contacts of the two relays are connected to the other terminal of the motor armature. Hence energisation of one relay in place of the other results in the polarity of the volatge applied to the armature being reversed and thus in the direction of rotation of the motor being reversed.

The limit switches 57, which, as stated above, are normally held closed, are arranged to open under the action of respective cams (not shown) carried on the shaft coupling the output of the motor to the wiper 58 of the "reset" potentiometer 59. The cams act to open the switches only on malfunction of the apparatus to cause the motor to drive the wiper of the potentiometer 59 beyond an upper or a lower predetermined limiting position along the length of the potentiometer. The opening of a limit switch is thus such as to cut off the flow of current to the armature to prevent movement of the wiper 58 beyond the appropriate limit.

Power to energise the actuating coils of the relays 53, 54, is provided by the rectified output of a second stepdown transformer 61. The power is delivered to an appropriate one of the relay actuating coils on energisation of a third relay 62 (the primary relay) when the magnitude of the output signal from the phase detector exceeds the fixed amount which corresponds with the maximum difference allowed between the sensed and "datum" moisture content values referred to above before adjustment of the "reset" potentiometer.

In dependence upon the polarity of the output signal, energisation of the primary relay 62 is such as to cause its single moving contact 63 to shift from a neutral position into electrical engagement with an appropriate one of two contacts 64, 65, each coupled through one of the actuating coils of the two relays 53, 54 to the negative pole of a full wave bridge rectifying circuit 66 connected across the output winding of the transformer 61. The positive pole of the bridge rectifier circuit 66 is connected to the moving contact 63 through a resistor 67 which together with a capacitor 68 connected across the bridge rectifying circuit provides smoothing for the rectifier output.

A spark arresting circuit 69 comprising a resistor and capacitor coupled in series is connected between each of the contacts 64 and 65 and the moving arm 63, and a diode 71 is connected across the actuating coils of each of the two relays 53, 54 for the purpose of damping the electrical oscillations developed across the coils on de-energisation of the primary relay 62.

The actuating coil of the primary relay is connected through an adjustable resistor 72 across the output terminals of the amplifier 101 (FIGURE 3) receiving the output signal from the phase detector as is also the dividing circuit 73 which determines the proportion of the voltage output signal which together with the "reset" voltage from the potentiometer 59 forms the control signal applied to the coupling system. The dividing circuit, which has one end thereof connected to the potentiometer wiper 58, consists of 100K resistor 74 and a diode 75 connected in parallel and coupled in series with two 2.2K resistors 76, also connected in series. The control signal which is developed between the negative end of the winding of the potentiometer 59 and the junction between the two resistors 76 is connected to the coupling system 108 through leads 77, 88.

The polarity of the diode 75 is arranged so that the diode acts to shunt the 100K resistor 74 when the junction of that resistor 74 and the adjacent resistor 76 becomes negative with respect to the other end 82 of the resistor 74. Accordingly when the measured output moisture content rises above the "datum" value the potential developed across the resistor 74 falls to zero and the proportion of the voltage output signal fed to the coupling system drops to 50%. On the other hand when the measured moisture content lies below the "datum" value, the diode 75 is not effective to shunt the resistor 74 and so, in view of the large value of resistor 74 in comparison with the sum of the values of the two resistors 76, virtually the whole of the amplified voltage output signal from the phase detector is developed across the resistor 74 for feeding to the coupling system as part of the control signal.

Accordingly it can be seen that when the sensed value of moisture content of the grain leaving the drier is greater than the "datum" value the proportional component of the control signal is smaller than that which arises when the sensed value of the moisture content is less than the "datum" value.

In this way, when the sensed moisture content is lower than the "datum" value and for a given change in the moisture content of the grain, the resulting change in the rate of flow of grain as a result of the control applied by the control apparatus is greater than that caused by a similar change in the moisture content when the moisture content is larger than the "datum" value. This, it is found, provides the apparatus with a more equal potential moisture content correction since non-linearity in the relationship between the amount of moisture removed from the grain following changes in the rate of flow of grain through the drier is allowed for.

Figure 7:
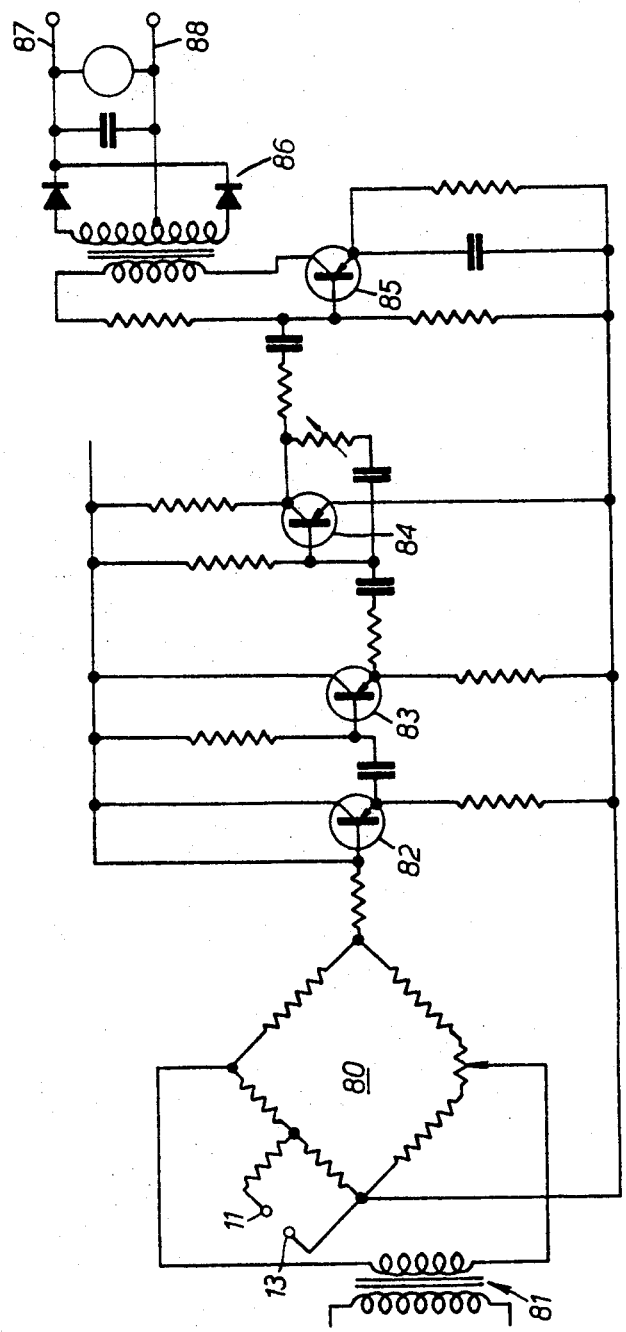
FIGURE 7 is a circuit diagram of the input moisture sensor monitor unit.

The base voltage applied across the potentiometer 59 is automatically adjusted in accordance with the sensed moisture content of the material entering the drying plant. The input moisture content sensor includes the electrode 13 positioned in the inlet chute 11, the spacing between the electrode and either of the walls being approximately 2″. The electrical resistance of the grain bridging the gap between the electrodes may vary between 10MΩ at 14% moisture content and 10KΩ at 24% moisture content. As illustrated in FIGURE 7 the electrodes 13 and 11 are connected into one arm of a Wheatstone bridge 80 supplied with alternating current from a transformer 81, the bridge being designed to be balanced at the high moisture content value, while the out-of-balance signal represents the variation in humidity from this value. The out-of-balance signal is amplified through three transistor amplifier stages 82, 83, 84, and an output stage 85, and rectified in a half-wave rectifier circuit 86, to provide an output D.C. signal at terminals 87, 88 varying from 12 v. at 28% moisture content to 26 v. at 14% moisture content, the change in voltage being approximately proportional to the change in moisture content over the greater part of this range. As shown in FIGURE 4 these terminals 87, 88 are connected to opposite ends of the potentiometer 59, and thus it will be seen that variations in the moisture content of the incoming grain provide a control signal which is superimposed upon the reset signal derived from the output moisture sensor.

In the embodiment described and illustrated in the block diagram of FIGURE 3 the output from the control circuit 106 is applied to control the coupling system 108 so as to vary the speed at which the flow control device 110, in this case an oscillating grid, is driven by the constant speed motor 109. In an alternative system which may be preferred in some applications the output from the control circuit 106 may be applied to control a variable speed motor, such as the motor 22 in FIGURE 5, so as to vary the rate at which dry grain is removed from the outlet end of the drier, and hence to control the rate of flow of grain through the drier.

What I claim as my invention and desire to secure by Letters Patent is:

1. Apparatus for controlling the drying of particulate material, including input and output moisture sensors positioned respectively adjacent the input and output points of a drying plant through which the material is passed, and control means for controlling the degree of drying effected, the control means including means for providing a control signal which varies with changes in the moisture content sensed at the output sensor, a reset device for imposing an additional control factor on the control signal when the sensed output moisture content passes out of a selected range, and means for imposing a further control factor which varies in accordance with variations in the moisture content sensed at the input sensor.

2. Apparatus as claimed in claim 1, in which the means for imposing the further control factor is arranged to vary the additional control factor imposed by the reset device.

3. Apparatus as claimed in claim 1, in which the reset device includes a reversible electric motor driving a potentiometer from which the reset signal is obtained.

4. Apparatus as claimed in claim 3, in which the electric motor is controlled in response to changes in the moisture content sensed at the output sensor, and the base voltage applied to the potentiometer is controlled in response to changes in the moisture content sensed at the input sensor, or vice versa.

5. Apparatus as claimed in claim 1, in which the input moisture sensor is of the resistance type, and the output sensor is of the capacitance type.

6. Apparatus as claimed in claim 1, in which the control means includes a proportioning device arranged to produce a larger proportional change in the output control signal when the sensed moisture content is below a selected datum value, and a smaller proportional change when the sensed moisture content is above this value.

7. Apparatus as claimed in claim 6, in which the proportioning device includes a resistor and rectifier connected in parallel across the input connections from the moisture sensor to the control means.

8. Apparatus as claimed in claim 1, including temperature compensating means, arranged to compensate for errors in the signal obtained from one of the moisture sensors caused by variations in the temperature of the material.

9. Apparatus as claimed in claim 8, in which the temperature compensating means includes a compensating capacitor housed in a recess in one of the electrodes of a moisture sensor.

10. Apparatus as claimed in claim 1, in which the output moisture sensor is of the capacitance type and is included in an A.C. bridge circuit, providing an A.C. output whose amplitude and phase are related respectively to the magnitude and sense of the difference between the sensed output moisture content and a selected moisture content.

11. Apparatus as claimed in claim 10, in which the reset device includes a reversible electric motor driving a potentiometer from which the reset signal is obtained, a phase-sensitive detector, connected to the output of the output moisture sensor to provide a D.C. signal whose polarity varies in accordance with changes in the sense of the sensed moisture content in relation to the selected moisture content, and a primary switching device actuated by the D.C. signal from the phase detector to control the direction of rotation of the electric motor driving the potentiometer.

12. Apparatus as claimed in claim 1, in which the control means is arranged to control the rate of flow of material through a drying section of the apparatus.

References Cited
UNITED STATES PATENTS

| | | | |
|---|---|---|---|
| 2,862,304 | 12/1958 | Eicken dit Estienne | 34—52 |
| 3,191,313 | 6/1965 | Moorhouse et al. | 34—52 |
| 3,280,474 | 10/1966 | Van Doorn et al. | 34—31 |

JOHN J. CAMBY, *Acting Primary Examiner.*